(12) United States Patent
Kurauchi et al.

(10) Patent No.: US 10,427,680 B2
(45) Date of Patent: Oct. 1, 2019

(54) CONTROL SYSTEM FOR VEHICLE, AND CONTROL METHOD FOR VEHICLE

(71) Applicant: HONDA MOTOR CO., LTD., Tokyo (JP)

(72) Inventors: Atsushi Kurauchi, Wako (JP); Shintaro Mito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 15/428,149

(22) Filed: Feb. 9, 2017

(65) Prior Publication Data

US 2017/0240173 A1 Aug. 24, 2017

(30) Foreign Application Priority Data

Feb. 19, 2016 (JP) .................................. 2016-030320
Nov. 16, 2016 (JP) .................................. 2016-223527

(51) Int. Cl.
*B60W 30/14* (2006.01)
*B60W 30/188* (2012.01)
*B60W 20/00* (2016.01)

(52) U.S. Cl.
CPC .......... *B60W 30/143* (2013.01); *B60W 20/00* (2013.01); *B60W 30/188* (2013.01); *B60W 2510/244* (2013.01); *B60W 2540/10* (2013.01); *B60W 2710/0666* (2013.01)

(58) Field of Classification Search
CPC .. B60W 20/00; B60W 30/143; B60W 30/188; B60W 2510/244; B60W 2540/10; B60W 2710/0666; B60W 2720/125; B60W 2720/40

See application file for complete search history.

(56) References Cited

U.S. PATENT DOCUMENTS

2011/0297462 A1 12/2011 Grajkowski et al.

FOREIGN PATENT DOCUMENTS

JP 2014-156170 8/2014

OTHER PUBLICATIONS

Japanese Office Action for corresponding JP Application No. 2016-223527, Apr. 17, 2018 (w/ machine translation).

*Primary Examiner* — Jerrah Edwards

(74) *Attorney, Agent, or Firm* — Mori & Ward, LLP

(57) ABSTRACT

A control system for a vehicle includes an acceleration operation sensor to detect an amount of an acceleration operation. Circuitry is configured to calculate a first acceleration control amount as an acceleration control amount based on the amount of the acceleration operation according to a relationship between the amount of the acceleration operation and the first acceleration control amount when it is determined that the vehicle is not in a delivery state. The circuitry is configured to calculate a second acceleration control amount as the acceleration control amount based on the amount of the acceleration operation according to a second relationship between the amount of the acceleration operation and the second acceleration control amount when it is determined that the vehicle is in the delivery state. The second acceleration control amount is smaller than the first acceleration control amount with respect to the amount of the acceleration operation.

17 Claims, 9 Drawing Sheets

CONTROL SYSTEM FOR VEHICLE, AND CONTROL METHOD FOR VEHICLE

CROSS-REFERENCE TO RELATED APPLICATIONS

The present application claims priority under 35 U.S.C. § 119 to Japanese Patent Application 2016-030320, filed Feb. 19, 2016, entitled "Control Apparatus for Vehicle" and Japanese Patent Application No. 2016-223527, filed Nov. 16, 2016, entitled "Control System for Vehicle." The contents of these applications are incorporated herein by reference in their entirety.

BACKGROUND

1. Field

The present disclosure relates to a control system for a vehicle and a control method for a vehicle.

2. Description of the Related Art

Japanese Unexamined Patent Application Publication No. 2014-156170 describes a vehicle control system that limits drive by an electric motor in order to suppress a drop in a charge level of a battery for supplying electric power to the electric motor when a hybrid vehicle, provided with an internal combustion engine and the electric motor as motive power sources, is being delivered from the factory of manufacture to a sales location.

SUMMARY

According to one aspect of the disclosure, a control system for a vehicle includes: a drive torque controller that controls drive torque in a vehicle driven by a motive power source; an accelerator operation amount detection unit that detects an accelerator operation amount indicating intent of a driver of the vehicle to accelerate; a conversion unit that converts the accelerator operation amount detected by the accelerator operation amount detection unit to a controlled accelerator operation amount; and a delivery state determination unit that determines a delivery state in which the vehicle is being delivered from a factory of manufacture to a sales location. The drive torque controller performs the drive torque control so as to increase the drive torque the greater the controlled accelerator operation amount. The conversion unit includes a delivery conversion table applied in the delivery state, and employs the delivery state conversion table to execute the conversion when the vehicle has been determined to be in the delivery state by the delivery state determination unit. The delivery conversion table is set such that the drive torque is reduced in comparison to when a normal conversion table is applied in a normal operation state other than the delivery state.

According to another aspect of the disclosure, a control system for a vehicle includes an acceleration operation sensor and circuitry. The acceleration operation sensor is to detect an amount of an acceleration operation operated by a driver in the vehicle. The circuitry is configured to determine whether or not the vehicle is in a delivery state. The circuitry is configured to calculate a first acceleration control amount as an acceleration control amount based on the amount of the acceleration operation according to a relationship between the amount of the acceleration operation and the first acceleration control amount when it is determined that the vehicle is not in the delivery state. The circuitry is configured to calculate a second acceleration control amount as the acceleration control amount based on the amount of the acceleration operation according to a second relationship between the amount of the acceleration operation and the second acceleration control amount when it is determined that the vehicle is in the delivery state. The second acceleration control amount is smaller than the first acceleration control amount with respect to the amount of the acceleration operation. The circuitry is configured to control a drive torque outputted by the vehicle to increase as the acceleration control amount increases.

According to further aspect of the disclosure, a control method for a vehicle includes detecting an amount of an acceleration operation operated by a driver in a vehicle. Whether or not the vehicle is in a delivery state is determined. A first acceleration control amount is calculated as an acceleration control amount based on the amount of the acceleration operation according to a relationship between the amount of acceleration operation and the first acceleration control amount when it is determined that the vehicle is not in the delivery state. A second acceleration control amount is calculated as an acceleration control amount based on the amount of the acceleration operation according to a second relationship between the amount of the acceleration operation and the second acceleration control amount when it is determined that the vehicle is in the delivery state. The second acceleration control amount is smaller than the first acceleration control amount with respect to the amount of the acceleration operation. A drive torque outputted by the vehicle is controlled to increase the drive torque as the acceleration control amount increases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
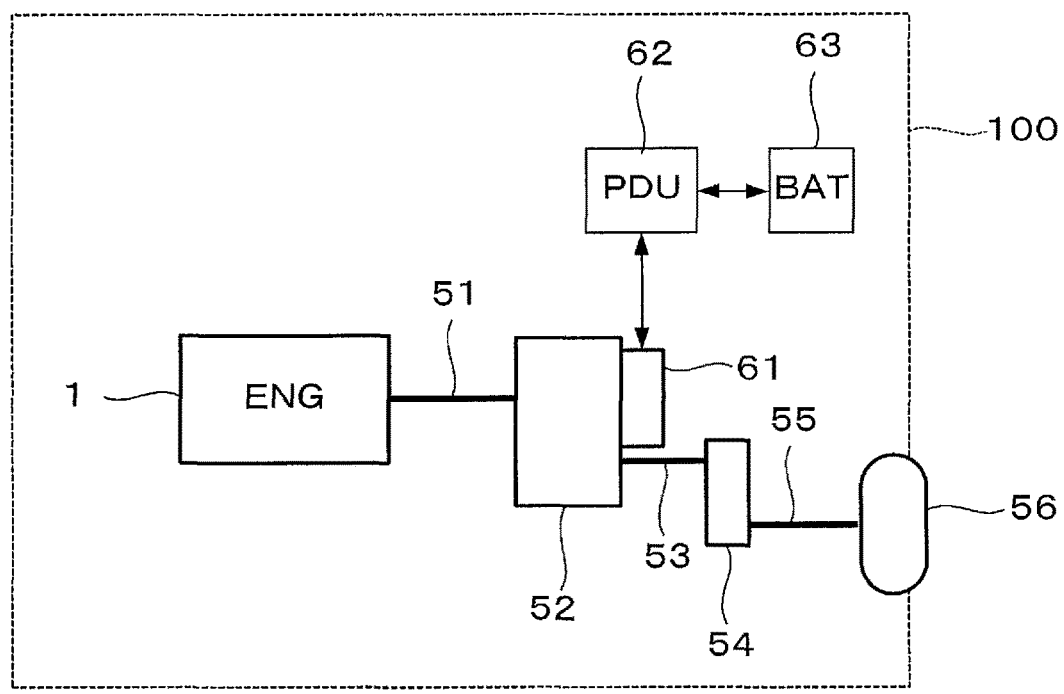
FIG. 1 is a diagram illustrating configuration of a vehicle drive system for driving a vehicle according to an embodiment of the present disclosure.

The embodiments will now be described with reference to the accompanying drawings, wherein like reference numerals designate corresponding or identical elements throughout the various drawings.

Explanation follows regarding an embodiment of the present disclosure, with reference to the drawings.

First Embodiment

FIG. 1 is a diagram illustrating configuration of a vehicle drive system for driving a vehicle 100 according to an embodiment of the present disclosure. The vehicle drive system includes an internal combustion engine (referred to hereafter as the "engine") 1, serving as a motive power source, an electric motor (referred to hereafter as the "motor") 61, capable of operating as both a motive power source and a generator, and a transmission 52 that transmits drive power of the engine 1 and/or the motor 61. A crank shaft 51 of the engine 1 is connected to the transmission 52, and configuration is made such that a drive wheel 56 is driven through an output shaft 53 of the transmission 52, a differential gear mechanism 54, and a drive shaft 55. The motor 61 is connected to a power drive unit (referred to hereafter as "PDU") 62, and the PDU 62 is connected to a high voltage battery 63. The transmission 52 is a twin clutch transmission including an odd number gear clutch and an even number gear clutch, respectively corresponding to odd numbered gears and even numbered gears. The vehicle 100 is capable of traveling in an engine mode operating only the engine 1 as the motive power source, and of traveling in a hybrid mode operating both the engine 1 and the motor 61 as the motive power source. In a state in which both of the twin clutches of the transmission 52 are released, the vehicle 100 is capable of traveling in an electric mode operating only the motor 61 as a motive power source.

When the motor 61 is driven with positive drive torque, namely, when the motor 61 is driven using electric power output from the high voltage battery 63, the electric power output from the high voltage battery 63 is supplied to the motor 61 through the PDU 62. When the motor 61 is driven with negative drive torque, namely during a regeneration operation of the motor 61, electric power generated by the motor 61 is supplied to the high voltage battery 63 through the PDU 62, and used to charge the high voltage battery 63. The PDU 62 is connected to an electronic control unit (referred to hereafter as "ECU") 5, illustrated in FIG. 2, and controls operation of the motor 61 and controls charging and discharging of the high voltage battery 63.

Figure 2:
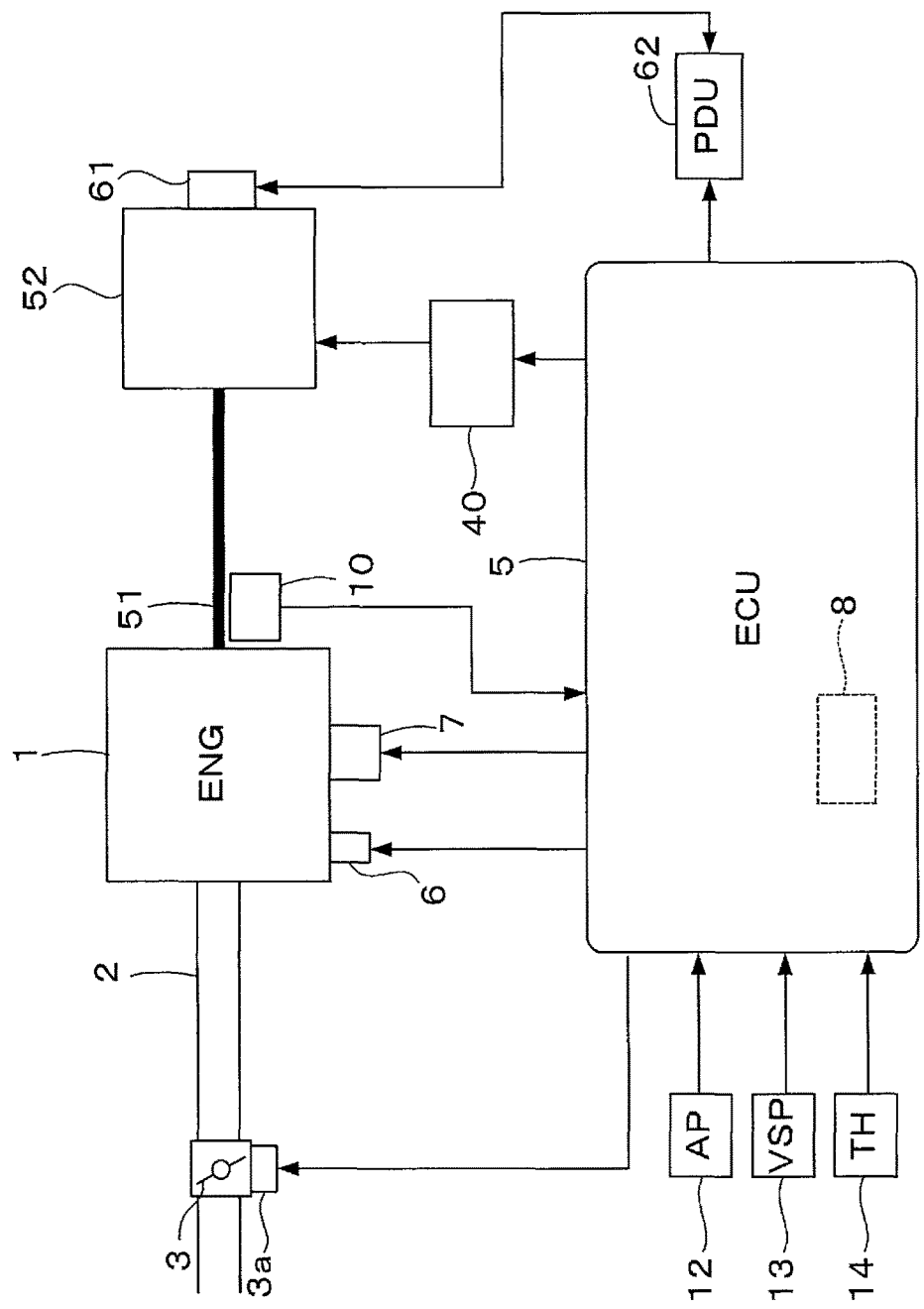
FIG. 2 is a diagram illustrating configuration of a control system for controlling the vehicle drive system illustrated in FIG. 1.

FIG. 2 is a diagram illustrating configuration of a control system for controlling the vehicle drive system illustrated in FIG. 1. The ECU 5 illustrated in FIG. 2 is, in reality, configured by plural ECUs connected together through a communication network. However, since such ECU configurations are widely known, this configuration is represented by the single ECU 5. The ECU 5 includes a non-volatile memory (memory that retains stored content even after its power source has been turned off) 8, and can be written to from an external device via a communication interface (not illustrated in the drawings). Vehicle state information INFVHL, indicating whether or not the vehicle 100 is in a delivery state, is written to the non-volatile memory 8. At the factory where the vehicle 100 is manufactured, directly prior to shipment of the vehicle 100, information indicating that the vehicle 100 is in the delivery state is written using a dedicated information writing device provided at the factory. An information update to release the delivery state, namely processing to overwrite the vehicle state information with information indicating that the vehicle 100 is not in the delivery state, is performed using a dedicated information writing device provided at the sales location to which the vehicle 100 is delivered.

The engine 1 includes, for example, six cylinders, and is provided with an air intake path 2. The air intake path 2 is provided with a throttle valve 3, and an actuator 3a that drives opening and closing of the throttle valve 3 is connected to the ECU 5. Each cylinder of the engine 1 is provided with a fuel injection valve 6 that injects fuel directly into a combustion chamber, and a spark plug 7.

A crank angle sensor 10 that detects a rotation angle of the crank shaft 51 of the engine 1 is connected to the ECU 5, and supplies the ECU 5 with signals according to the rotation angle of the crank shaft 51. The crank angle sensor 10 is fixed to the crank shaft 51, and includes a pulse wheel, this being a disk shaped magnetic body formed around its outer circumference with teeth at intervals of a specific angle CA1 (for example 6°), and a pick-up coil disposed facing the pulse wheel. Detection of an engine revolution speed NE, and timing control of a fuel injecting timing, an ignition timing, and the like are performed based on the pulse signals output from the crank angle sensor 10.

Operation of the transmission 52 is controlled by an actuator 40. The actuator 40 is connected to the ECU 5.

The ECU 5 performs drive control of the fuel injection valves 6, the spark plugs 7, the motor 61, the transmission 52, and the like based on detection signals from an accelerator sensor 12 that detects a press-down amount AP (an amount AP of an acceleration operation) of an accelerator pedal of the vehicle 100, a vehicle speed sensor 13 that detects a vehicle speed VSP, a throttle valve opening amount sensor 14 that detects an opening amount of the throttle valve 3, and other sensors that are not illustrated in the drawings (for example a sensor that detects an air intake pressure PBA of the engine 1, a sensor that detects cooling water temperature TW of the engine 1, and a sensor that detects an air intake temperature TA).

The ECU 5 controls fuel injection by the fuel injection valves 6, controls ignition of the spark plugs 7, and controls an air intake amount through the throttle valve 3, corresponding to an engine operation state (in particular, the engine revolution speed NE and a required torque TRQD). The required torque TRQD is computed according mainly to the accelerator pedal operation amount AP, and is computed so as to increase the greater the accelerator pedal operation amount AP. Output control of the engine 1 and/or the motor 61 is performed such that a drive torque TRQDRV of the vehicle 100, this being the sum of an output torque TRQE of the engine 1 and an output torque TRQM of the motor 61, matches the required torque TRQD. The opening amount of the throttle valve 3 is controlled through the actuator 3a.

The drive torque TRQDRV obtained from the engine 1 and the motor 61 is comparatively large. Accordingly, when the vehicle 100 is in the delivery state between leaving the factory and reaching the sales location, the accelerator pedal operation amount AP is converted into a controlled accelerator pedal operation amount APSPDRBX, and the required torque TRQD is computed according to the controlled accelerator pedal operation amount APSPDRBX, in order to lessen the burden on a driver when the vehicle 100 is being driven by a driver.

Figure 3:
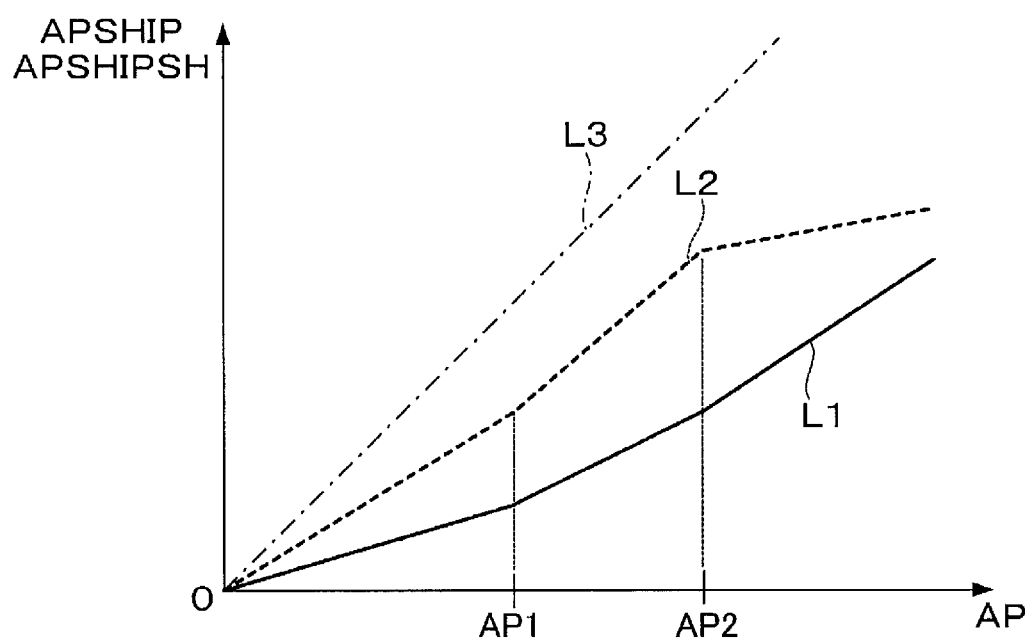
FIG. 3 is a diagram illustrating a table employed to convert a detected accelerator pedal operation amount to a controlled accelerator pedal operation amount.

Specifically, in the delivery state, the APSHIP table (a second relationship between the amount of the acceleration operation and a second acceleration control amount) illustrated by the solid line L1 in FIG. 3 is used to convert the accelerator pedal operation amount AP into a shipping mode accelerator pedal operation amount (referred to hereafter as the "SHPAP operation amount") APSHIP (the second acceleration control amount APSHIP), and the controlled accelerator pedal operation amount APSPDRBX is set to the SHPAP operation amount APSHIP. A slope KAP of linear conversion characteristics illustrated by the solid line L1 is defined by Equation (1) below. A first value KAP1 is used with the accelerator pedal operation amount AP in a range of a first specific amount AP1 or lower, a second value KAP2 is used with the accelerator pedal operation amount AP in a range greater than the first specific amount AP1 and no greater than a second specific amount AP2, and a third value KAP3 is used with the accelerator pedal operation amount AP in a range greater than the second specific amount AP2. The first to the third values KAP1, KAP2, and KAP3 are set so as to satisfy the relationship in Equation (2) below.

$$KAP=DAPSHIP/DAP \quad (1)$$

Note that DAPSHIP is the amount of increase in the SHPAP operation amount APSHIP when the accelerator pedal operation amount AP has increased by DAP.

$$KAP1<KAP2<KAP3 \quad (2)$$

The relationship illustrated by the dot-dash line L3 in FIG. 3 (a relationship between the amount of the acceleration operation and a first acceleration control amount) corresponds to a case in which the controlled accelerator pedal operation amount APSPDRBX (the first acceleration control amount APSPDRBX) is set using the accelerator pedal operation amount AP as-is (this being a relationship applied when in a normal vehicle operation state other than the delivery state, and corresponds to a normal conversion table). The slopes KAP (KAP1, KAP2, KAP3) of the solid line L1 are set so as to be gentler than the slope of the dot-dash line L3. Accordingly, by employing the APSHIP table, the amount of increase in the drive torque TRQDRV with respect to the amount of increase in the accelerator pedal operation amount AP is reduced in comparison to in the normal vehicle operation state (the operation sensitivity of the accelerator pedal is lowered), enabling the burden on the driver to be lessened when operating the accelerator pedal in the delivery state.

The APSHIP table is set such that the slope KAP becomes steeper the greater the accelerator pedal operation amount AP, thereby enabling the drive torque to be increased rapidly when a comparatively large drive torque is required (for example, when driving up a ramp during loading into a transporter ship).

Figure 4A:
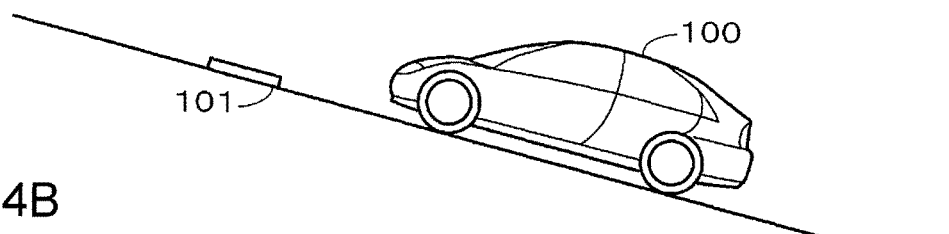
FIG. 4A is a diagram to explain a vehicle driving over a hump.
Figure 4B:
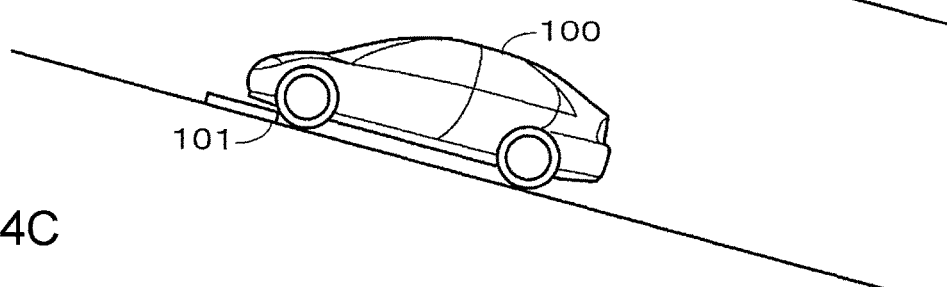
FIG. 4B is a diagram to explain a vehicle driving over a hump.
Figure 4C:
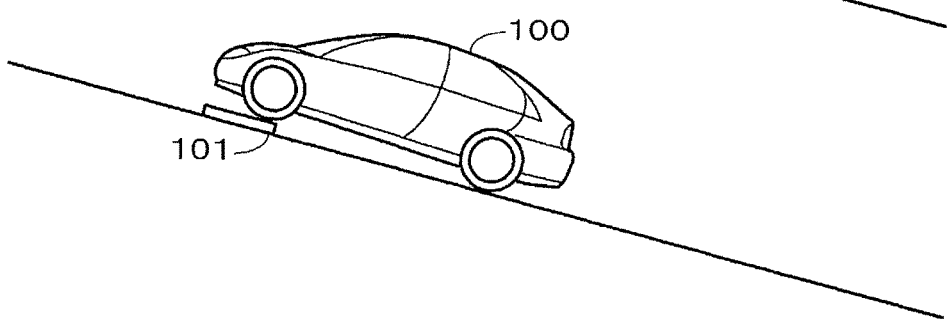
FIG. 4C is a diagram to explain a vehicle driving over a hump.

The dashed line L2 in FIG. 3 illustrates an APSHIPSH table (a third relationship between the amount of the acceleration operation and a third acceleration control amount) applied in order to drive over a hump 101, this being a hump present on the road surface on which the vehicle 100 is traveling, as illustrated in FIG. 4A to FIG. 4C, and that causes an increase in vehicle travel load. As illustrated in FIG. 4B, in a state in which the arrival of a front wheel of the vehicle 100 at the hump 101 (referred to hereafter as a "hump arrival state") has been detected, the APSHIPSH table is employed to convert the accelerator pedal operation amount AP into a specific SHPAP operation amount APSHIPSH (the third acceleration control amount APSHIPSH), and the controlled accelerator pedal operation amount APSPDRBX is set to the specific SHPAP operation amount APSHIPSH.

Applying the APSHIPSH table enables the drive torque TRQDRV of the vehicle 100 to be increased rapidly, and enables insufficient drive torque (poor driving characteristics) as a result of using the APSHIP table to be avoided, thereby enabling the hump 101 to be driven over smoothly.

Figure 5:
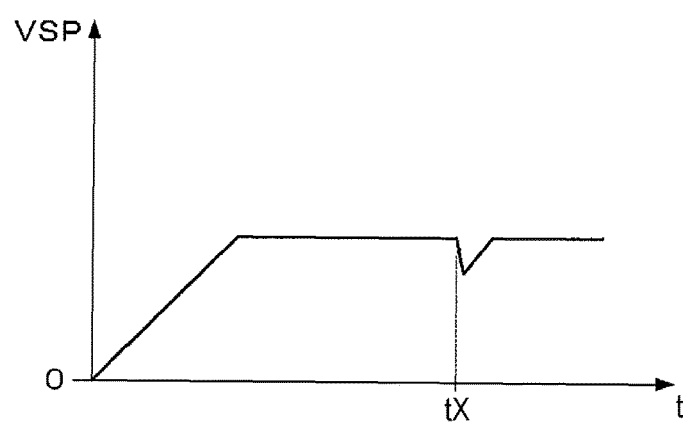
FIG. 5 is a time chart to explain a method for detecting a state in which a vehicle has arrived at a hump.

FIG. 5 is a time chart to explain a method for detecting the hump arrival state, and illustrates change in the vehicle speed VSP over time. When a front wheel of the vehicle 100 arrives at the hump 101 at a time tX with the vehicle speed VSP in a substantially constant state, the vehicle speed VSP decreases sharply, and so, in the present embodiment, the vehicle 100 is determined to have arrived at the hump 101 when a vehicle deceleration rate DVSPD, this being an amount of decrease per unit time of the vehicle speed VSP (corresponding to a previous value VSP (k−1)–the current value VSP (k) of a detected vehicle speed VSP(k) sampled at uniform intervals) exceeds a determination threshold value DVTH (>0), and the vehicle speed VSP is a low vehicle speed of a specific vehicle speed VOTL (for example, 20 km/h) or below.

Figure 6:
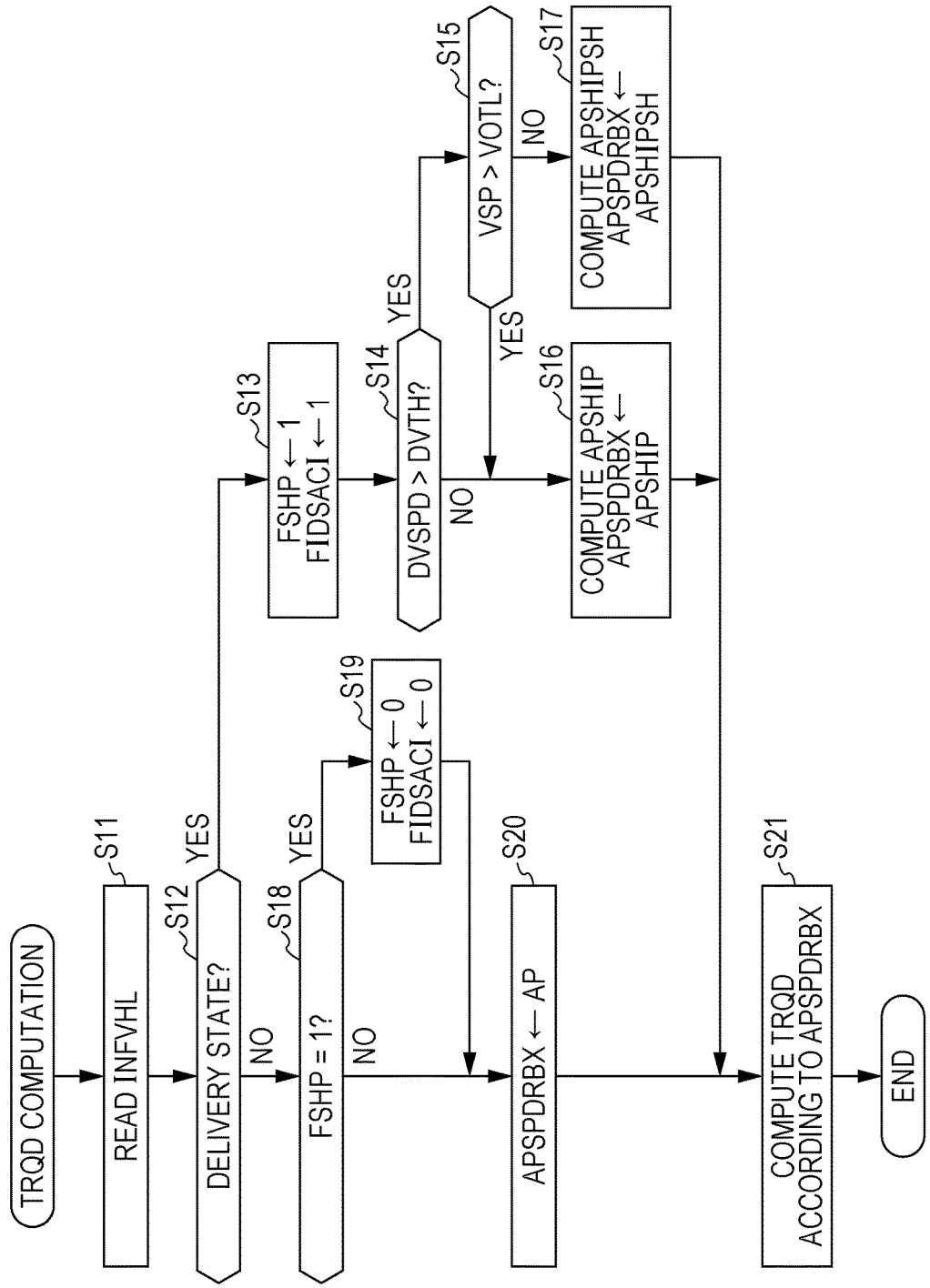
FIG. 6 is a flowchart of processing to compute a required torque.

FIG. 6 is a flowchart illustrating processing to compute the required torque TRQD. This processing is executed by the ECU 5 at uniform intervals.

At step S11, the vehicle state information INFVHL stored in the non-volatile memory 8 is read, and at step S12, determination is made as to whether or not the vehicle state information INFVHL is information indicating the delivery state. When the answer at step S12 is affirmative (YES), a delivery state flag FSHP is set to "1", and a prohibition flag FIDSACI is set to is set to "1" (step S13).

When the prohibition flag FIDSACI has been set to "1", travel mode switching and auto-cruise control (drive control to maintain a set travel speed) are prohibited. In the vehicle 100, the travel mode can be switched between an eco-mode, a normal mode, and a sports mode. The driver selects any one of the travel modes by performing a selection operation. In the eco-mode, drive control is performed so as to prioritize fuel efficiency. In the sports mode, drive control is performed so as to prioritize the drive torque. In the normal mode, drive control between that of the eco-mode and the sports mode is performed. Setting the delivery state flag FSHP to "1" sets the travel mode to a shipping mode.

At step S14, determination is made as to whether or not the vehicle deceleration rate DVSPD is greater than the determination threshold value DVTH. When the answer is negative (NO), processing transitions directly to step S16. At step S16, the APSHIP table illustrated by the solid line L1 in FIG. 3 is searched according to the accelerator pedal operation amount AP in order to compute the SHPAP operation amount APSHIP. The controlled accelerator pedal operation amount APSPDRBX is then set to the SHPAP operation amount APSHIP.

When the answer at step S14 is affirmative (YES), determination is made as to whether or not the vehicle speed VSP is higher than the specific vehicle speed VOTL (step S15). When the answer is affirmative (YES), processing transitions to step S16. When the answer is negative (NO), and the vehicle speed VSP is a low vehicle speed of the specific vehicle speed VOTL or lower, the vehicle 100 is determined to be in the hump arrival state, and the APSHIP table illustrated by the dashed line L2 in FIG. 3 is searched according to the accelerator pedal operation amount AP in order to compute the specific SHPAP operation amount APSHIPSH. The controlled accelerator pedal operation amount APSPDRBX is then set to the specific SHPAP operation amount APSHIPSH (step S17). Processing transitions to step S21 after the execution of step S16 or step S17.

When the answer at step S12 is negative (NO), and the vehicle 100 is not in the delivery state, determination is made as to whether or not the delivery state flag FSHP has been set to "1" (step S18). When the answer to this is negative (NO), processing transitions directly to step S20. When the answer to this is affirmative (YES), the delivery state flag FSHP and the prohibition flag FIDSACI are both set to "0" (step S19), and processing transitions to step S20.

At step S20, the controlled accelerator pedal operation amount APSPDRBX is set to the detected accelerator pedal operation amount AP (step S20). At step S21, the required torque TRQD is computed according to the controlled accelerator pedal operation amount APSPDRBX.

In the present embodiment, initial learning relating to clutch engagement, and initial learning of the crank angle sensor 10 relating to pulse generation intervals is executed when in the delivery state, rather than during the manufacturing process of the vehicle 100 in the factory. This enables initial learning to be performed without lowering productivity at the factory. The pulse generation interval learning of the crank angle sensor 10 is executed by the ECU 5, and as described in, for example, Japanese Patent No. 4339347, the entire contents of which are incorporated herein by reference, the pulse generation interval learning of the crank angle sensor 10 involves measuring pulse generation intervals of the crank angle sensor 10 during fuel-cut operation of the engine 1 (a state in which the fuel supply is cut off and the crank shaft 51 is rotation driven by the drive wheel 56 through the transmission 52), and computing a learning correction coefficient to correct the pulse generation intervals.

Figure 7:
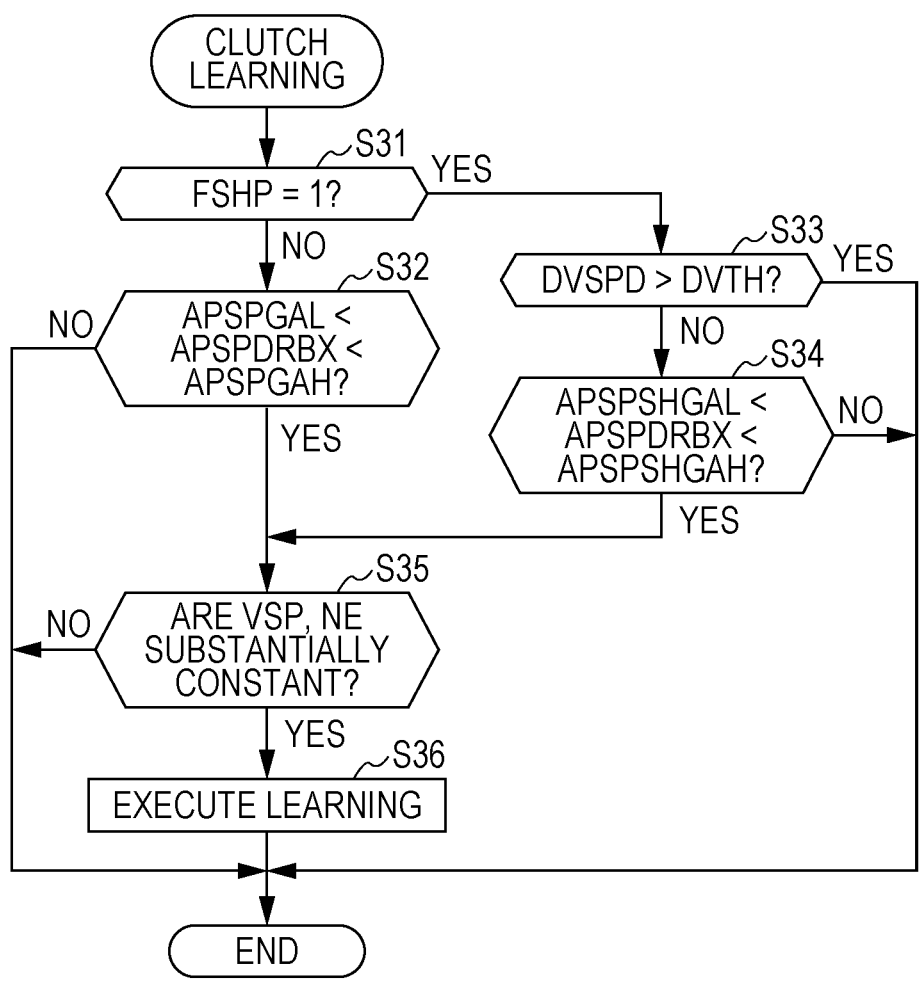
FIG. 7 is a flowchart of processing to perform clutch engagement learning and pulse generation interval learning in a crank angle sensor.

FIG. 7 is a flowchart of processing performed during twin clutch engagement learning for the transmission 52. This processing is executed by the ECU 5 at uniform intervals.

At step S31, determination is made as to whether or not the delivery state flag FSHP has been set to "1". When the answer is negative (NO), namely when the vehicle 100 is not in the delivery state, determination is made as to whether or not the controlled accelerator pedal operation amount APSP-DRBX is in a normal learning permitted range that is greater than a normal lower limit value APSPGAL and smaller than a normal upper limit value APSPGAH (step S32). When the answer is negative (NO), processing is ended immediately. When the answer at step S32 is affirmative (YES), determination is then made as to whether or not the vehicle speed VSP and the engine revolution speed NE are substantially constant (step S35). This determination is performed by, for example, determining whether or not a change amount of the vehicle speed VSP is within a range of ±5 km/h, and whether or not a change amount of the engine revolution speed NE is within a range of ±100 rpm. When the answer at step S35 is negative (NO), the processing is ended, and when the answer is affirmative (YES), processing transitions to step S36, and learning processing is executed.

When the answer at step S31 is affirmative (YES) and the vehicle 100 is in the delivery state, determination similar to that of step S14 in FIG. 6 is executed (step S33). When the answer is affirmative (YES), namely, if the vehicle deceleration rate DVSPD exceeds the determination threshold value DVTH, the processing is ended. When the answer at step S33 is negative (NO), determination is made as to whether or not the controlled accelerator pedal operation amount APSPDRBX is within a delivery learning permitted range that is greater than a delivery lower limit value APSPSHGAL and smaller than a delivery upper limit value APSPSHGAH (step S34). When the answer at step S34 is negative (NO), the processing is ended, and when the answer is affirmative (YES), processing transitions to step S35.

The delivery learning permitted range is set narrower than the normal learning permitted range. In the delivery state, the APSHIP table is employed to compute the controlled accelerator pedal operation amount APSPDRBX, thereby enabling the learning permitted range to be limited to a narrower range, and enabling learning to be performed consistently.

The learning processing at step S36 may, for example, be executed as follows.

1) In order for the transmission gear of the transmission 52 to shift up into third when set at a second gear speed, first, the transmission gear on the odd number gear clutch side is set to the third speed, and then the even number gear clutch is released. An example is considered in which, immediately prior to releasing the even number gear clutch, the vehicle speed VSP is 30 km/h, and the engine revolution speed NE is 1500 rpm.

2) In this state, the engine revolution speed NE is brought down to 1100 rpm, and an operation to engage the odd number gear clutch is started.

3) A displacement amount DPC of the clutch disk of the odd number gear clutch is measured at a point in time when the engine revolution speed NE has dropped by a specific rotation speed DNE (for example 50 rpm) from 1100 rpm.

4) Based on the measured displacement amount DPC, a learning correction amount is computed for a transmission command signal supplied to the actuator 40.

Note that learning correction amounts are computed for the even number gear clutch in a similar manner to that described above, for example, while executing an operation to shift up from the third gear speed to a fourth gear speed.

Figure 8:
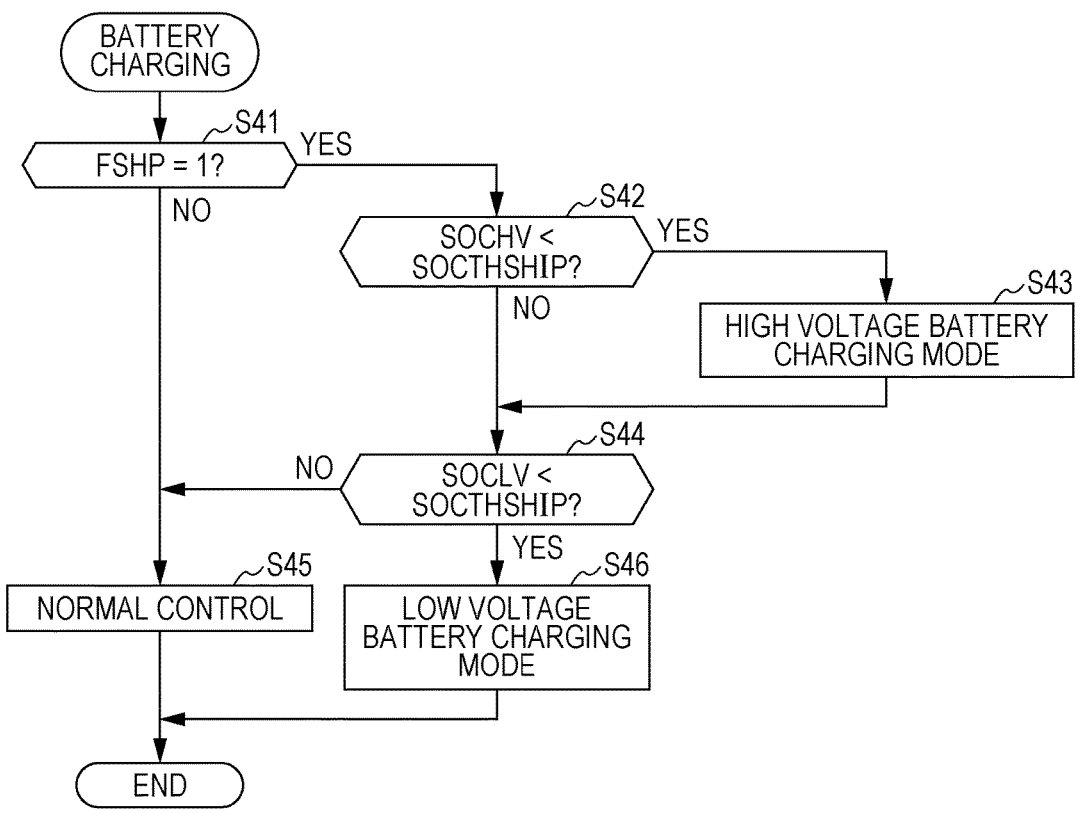
FIG. 8 is a flowchart of processing to perform battery charge control.

FIG. 8 is a flowchart of processing for performing battery charge control. This processing is executed by the ECU 5 at uniform intervals.

At step S41, determination is made as to whether or not the delivery state flag FSHP has been set to "1". When the answer is negative (NO), normal control is executed (step S45). When the answer at step S41 is affirmative (YES), determination is made as to whether or not a state of charge SOCHV of the high voltage battery 63 (expressed as a proportion (%), where a fully charged state is 100%) is below a determination threshold value SOCTHSHIP (set at, for example, 95%) (step S42). When the answer to this is affirmative (YES), transition is made to a high voltage battery charging mode to charge the high voltage battery 63 (step S43), and processing transitions to step S44.

When the answer at step S42 is negative (NO), processing proceeds directly to step S44, and determination is made as to whether or not a state of charge SOCLV of a low voltage battery (a battery that supplies electric power to the ECU 5 and the like at an output voltage of around 12V, not illustrated in the drawings) is smaller than a determination threshold value SOCTHSHIP (step S44). When the answer to this is negative (NO), normal control is executed. When the answer at step S44 is affirmative (YES), transition is made to a low voltage battery charging mode to charge the low voltage battery (step S46).

In the present embodiment configured as described above, the detected accelerator pedal operation amount AP is converted to the controlled accelerator pedal operation amount APSPDRBX, and the drive torque TRQDRV that is the sum of the torques output by the engine 1 and the motor 61 is controlled so as to increase the greater the controlled accelerator pedal operation amount APSPDRBX. The vehicle 100 is determined to be in the delivery state when under delivery from the factory of manufacture to the sales location, and when the vehicle 100 has been determined to be in the delivery state, the detected accelerator pedal operation amount AP is converted to the controlled accelerator pedal operation amount APSPDRBX using the APSHIP table. The APSHIP table is set so as to reduce the drive torque TRQDRV in comparison to the normal conversion table applied in the normal operation state other than the delivery state (in which the controlled accelerator pedal operation amount APSPDRBX is set to the detected accelerator pedal operation amount AP as illustrated by the dot-dash line L3 in FIG. 3 in the present embodiment). This thereby enables the burden on the driver to be lessened when operating the accelerator pedal in the delivery state.

A ratio of the increase in the controlled accelerator pedal operation amount APSPDRBX against the amount of increase in the accelerator pedal operation amount AP, namely the slope KAP of the solid line L1 representing the APSHIP table, increases the greater the accelerator pedal operation amount AP. Namely, the operation sensitivity of the accelerator pedal increases the greater the accelerator pedal operation amount AP. This thereby enables the drive torque TRQDRV to be increased rapidly in cases in which a comparatively large drive torque TRQDRV is required (for example, when driving up a ramp during loading into a transporter ship).

When the hump arrival state has been detected based on the change in the vehicle speed VSP, the accelerator pedal operation amount AP is converted to the controlled accelerator pedal operation amount APSPDRBX using the APSHIPSH table. The APSHIPSH table is set so as to increase the drive torque in comparison to the APSHIP table. As a result, for example, when a hump 101 of a size that can be driven over is present on the road on which the vehicle is traveling, the hump arrival state is detected when a front wheel of the vehicle has arrived at the hump 101, and the APSHIPSH table is applied to increase the drive torque more rapidly. A situation in which the drive torque is insufficient as a result of using the APSHIP table can accordingly be avoided.

Learning to correct for variation in the characteristics of the components configuring the vehicle drive system including the engine 1 and the motor 61, and more specifically, characteristics of the crank angle sensor 10 and of the twin clutches of the transmission 52, or for variation in control parameters arising due to component assembly tolerance, is executed while the vehicle 100 is in the delivery state. If learning were to be performed during manufacture in the factory, since the time taken to carry out a learning process is longer than that for other processes, this would cause a drop in overall productivity. However, in the delivery state, the vehicle speed VSP and the engine revolution speed NE are comparatively low, and fluctuations thereof are small, and this is well-suited to performing such learning. Accordingly, performing learning when in the delivery state enables learning to be performed without entailing a drop in productivity at the factory.

Moreover, in the delivery state, charging is performed so as to maintain the state of charge of the high voltage battery 63 that supplies electric power to the motor 61 substantially in a fully charged state (for example, such that the state of charge SOCHV is 95% or greater). This thereby enables a situation in which the battery has insufficient charge immediately after being purchased by a user to be reliably avoided.

At the factory, information indicating that the vehicle 100 is in the delivery state is written to the non-volatile memory 8 as the vehicle state information INFVHL, and at the sales location, the information indicating that the vehicle 100 is in the delivery state is overwritten with information indicating that the vehicle 100 is not in the delivery state. The vehicle state information INFVHL can only be updated using a dedicated writing device. This thereby enables the vehicle state information to be reliably prevented from being incorrectly overwritten with information indicating that the vehicle 100 is not in the delivery state, for example by driver operation when in the delivery state.

In the present embodiment, the accelerator sensor 12 and the vehicle speed sensor 13 respectively correspond to an accelerator operation amount detection unit (an acceleration operation sensor) and a vehicle speed detection unit (a vehicle speed sensor). The ECU 5 configures a conversion unit, a delivery state determination unit, and a learning unit. The ECU 5, the throttle valve 3, the PDU 62, and the like configure a drive torque controller, and the ECU 5, the PDU 62, the engine 1, and the motor 61 acting as a generator, configure a charging unit (a charger).

Second Embodiment

In the present embodiment, the engine 1, this being a motive power source of the vehicle 100, is replaced with an engine 1a including a supercharger (turbocharger). The present embodiment is similar to the first embodiment with the exception of the points described below.

Figure 9:
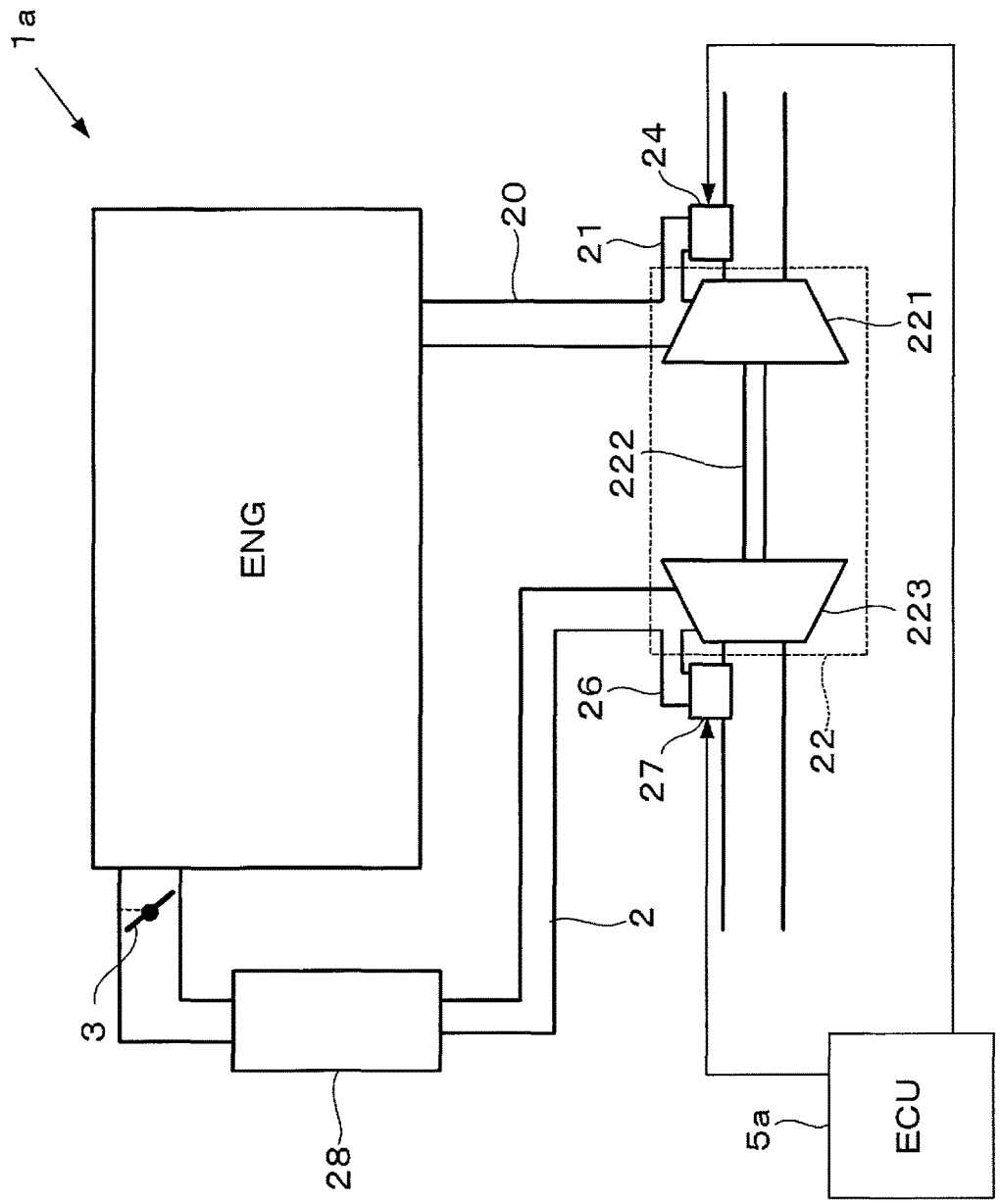
FIG. 9 is a diagram illustrating configuration of an internal combustion engine in a second embodiment of the present disclosure.

As illustrated in FIG. 9, the engine 1a includes the air intake path 2, an exhaust path 20, and a turbocharger (supercharger) 22. An intercooler 28 for cooling pressurized air is provided upstream of the throttle valve 3 in the air intake path 2.

The turbocharger 22 is provided on the exhaust path 20, and includes a turbine 221 that is rotation driven by the kinetic energy of exhaust gas, and a compressor 223 that is coupled to the turbine 221 through a shaft 222. The compressor 223 is provided on the air intake path 2, and pressurizes (compresses) air being taken in by the engine 1. A bypass path 26 that bypasses the compressor 223 is connected to the air intake path 2, and the bypass path 26 is provided with an air bypass valve (referred to hereafter as the "AB valve") 27 that regulates the flow rate of air passing through the bypass path 26.

A bypass path 21 that bypasses the turbine 221 is connected to the exhaust path 20. The bypass path 21 is provided with a wastegate valve (referred to hereafter as the "WG valve") 24 that regulates the flow rate of exhaust gas passing through the bypass path 21.

The WG valve 24 and the AB valve 27 are connected to an ECU 5a. The ECU 5a executes similar control to the ECU 5 of the first embodiment, and also controls the opening amount of the WG valve 24 and the AB valve 27, and controls supercharging by the turbocharger 22. The greater the opening amount of the WG valve 24 and the AB valve 27, the lower the supercharge pressure (pressure downstream of the compressor).

Figure 10:
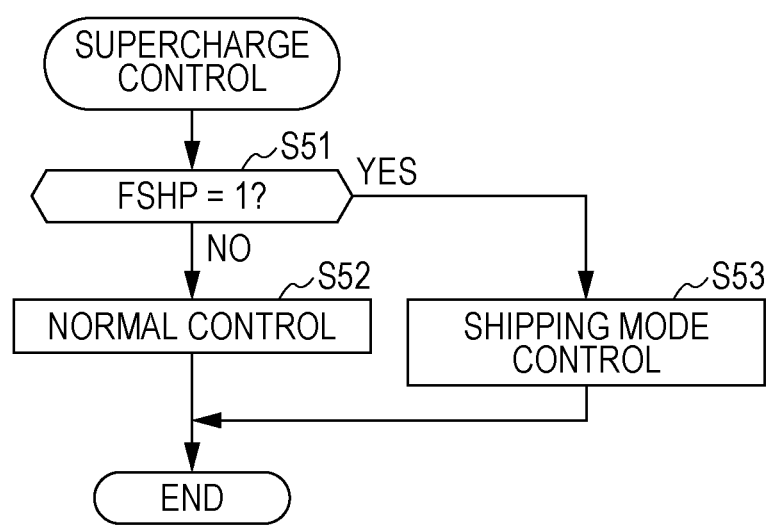
FIG. 10 is a flowchart to explain supercharger control in a second embodiment.

FIG. 10 is a flowchart to explain supercharge control of the present embodiment. In the normal operation state in which the delivery state flag FSHP has been set to "0", normal control is executed (steps S51, S52), and when the delivery state flag FSHP has been set to "1", and the vehicle 100 is in the delivery state, shipping mode control is executed (step S53). In shipping mode control, control is performed to increase the opening amount of the WG valve 24 and the AB valve 27 in comparison to when under normal control, lowering the supercharge pressure. The WG valve 24 and the AB valve 27 may be placed in a state in which the opening amount is fully open, and supercharging is not performed.

In the present embodiment, in the delivery state of the vehicle 100, the turbocharger 22 is controlled such that the supercharging pressure is lower than in the normal operation state, such that when the accelerator pedal is pressed down, the rate of increase of the intake air pressure is lower than in the normal operation state. This thereby enables the rate of increase of drive torque to be suppressed, and enables the burden on the driver in the delivery state to be lessened.

In the present embodiment, the ECU 5a, the WG valve 24, and the AB valve 27 configure a supercharger controller.

Note that the present disclosure is not limited to the embodiments described above, and various modifications may be implemented. For example, in the embodiments described above, explanation has been given regarding an example in which the vehicle 100 is a hybrid vehicle provided with the engine 1 and the motor 61 as the motive power source. However, (with the exception of the disclosure of claim 6) the present disclosure may also be applied to a control system of a vehicle provided with only an engine, or only a motor, as a motive power source. Moreover, the device by which the driver inputs their intention to accelerate is not limited to an accelerator pedal, and an input device configured by a manually operated lever may be employed. In such cases, an operation amount of the manually operated lever is applied as an accelerator operation amount.

In the embodiments described above, the normal conversion table, employed in the normal state when the vehicle 100 is not in the delivery state, uses the detected accelerator pedal operation amount AP as the controlled accelerator pedal operation amount APSPDRBX as-is (the dot-dash line L3 in FIG. 3). However, there is no limitation thereto. For example, a conversion table that performs some manner of conversion and includes intermediate change characteristics between the dot-dash line L3 and the dashed line L2 illustrated in FIG. 3 may be employed.

In the embodiment described above, explanation has been given regarding a vehicle driven by an internal combustion engine provided with both the WG valve 24 and the AB valve 27. However, the present disclosure may also be applied to a control system in a vehicle driven by an internal combustion engine provided with either one of the WG valve 24 or the AB valve 27.

A first aspect of the disclosure describes a vehicle control system including: a drive torque controller that controls drive torque in a vehicle driven by a motive power source; an accelerator operation amount detection unit that detects an accelerator operation amount indicating intent of a driver of the vehicle to accelerate; a conversion unit that converts the accelerator operation amount detected by the accelerator operation amount detection unit to a controlled accelerator operation amount; and a delivery state determination unit that determines a delivery state in which the vehicle is being delivered from a factory of manufacture to a sales location. The drive torque controller performs the drive torque control so as to increase the drive torque the greater the controlled accelerator operation amount. The conversion unit includes a delivery conversion table applied in the delivery state, and employs the delivery state conversion table to execute the conversion when the vehicle has been determined to be in the delivery state by the delivery state determination unit. The delivery conversion table is set such that the drive torque is reduced in comparison to when a normal conversion table is applied in a normal operation state other than the delivery state.

According to this configuration, the detected accelerator operation amount is converted to the controlled accelerator operation amount, and the drive torque of the vehicle is controlled so as to increase the greater the controlled accelerator operation amount. The delivery state is determined during delivery of the vehicle from the factory of manufacture to the sales location, and when the vehicle has been determined to be in the delivery state, the delivery conversion table is used to convert the detected accelerator operation amount to the controlled accelerator operation amount. The delivery conversion table is set such that the drive torque is reduced in comparison to when the normal conversion table is applied in the normal operation state other than the delivery state. This thereby enables the burden on the driver when operating an accelerator operation device such as an accelerator pedal to be lessened when in the delivery state.

In a second aspect of the disclosure, the vehicle control system of the first aspect may be configured such that the delivery conversion table is set such that a ratio of an amount of change in the controlled accelerator operation amount with respect to an amount of change in the detected accelerator operation amount changes according to the detected accelerator operation amount, such that the ratio increases the greater the detected accelerator operation amount.

According to this configuration, the ratio of the amount of change in the controlled accelerator operation amount against the amount of change in the detected accelerator operation amount increases the greater the detected accelerator operation amount. Namely, the greater the operation amount of the accelerator operation device, the greater the amount of increase in the controlled accelerator operation amount with respect to the amount of increase in the operation amount. This thereby enables the drive torque to be rapidly increased when a comparatively large drive torque is required (for example when ascending a ramp during loading onto a transporter ship).

In a third aspect of the disclosure, the vehicle control system of the first aspect may be configured further including: a vehicle speed detection unit that detects a vehicle speed of the vehicle; and a hump arrival state detection unit that, based on a change in the vehicle speed, detects a hump arrival state, this being a state in which a front wheel of the vehicle has arrived at a hump, which is present on a surface of a road on which the vehicle is traveling and that causes an increase in vehicle travel load. The conversion unit employs a specific conversion table to execute the conversion when the hump arrival state has been detected when in the delivery state, and the specific conversion table is set so as to increase the drive torque in comparison to that of the delivery conversion table.

According to this configuration, when the hump arrival state has been detected based on a change in the vehicle speed, the specific conversion table is employed to execute the conversion from the detected accelerator operation amount to the controlled accelerator operation amount. The specific conversion table is set so as to increase the drive torque in comparison to that of the delivery conversion table. As a result, for example, in cases in which a hump of a size that can be driven over is present on the road on which the vehicle is traveling, the hump arrival state is detected when the front wheel of the vehicle arrives at the hump, and the specific conversion table is employed to increase the drive torque rapidly. A situation in which there is insufficient drive torque (poor driving characteristics) as a result of using the delivery conversion table can accordingly be avoided.

In a fourth aspect of the disclosure, the vehicle control system of the first aspect may be configured further including a learning unit that performs learning in order to correct for either variation in a characteristic of a component configuring a vehicle drive system including the motive power source, or for variation in a control parameter resulting from assembly tolerance of the component. The learning unit executes the learning when in the delivery state.

According to this configuration, learning to correct for either characteristic variation in a characteristic of a component configuring a vehicle drive system including the motive power source, or to correct variation in a control parameter resulting from assembly tolerance of the component, is executed when in the delivery state. If learning were to be performed during manufacture in the factory, since the time taken to carry out a learning process is longer than that for other processes, this would cause a drop in overall productivity. However, in the delivery state, the vehicle speed and the engine revolution speed are comparatively low, and fluctuations thereof are small, and this is well-suited to performing such learning. Accordingly, performing learning when in the delivery state enables learning to be performed without entailing a drop in productivity at the factory.

In a fifth aspect of the disclosure, the vehicle control system of the first aspect may be configured such that the motive power source is an internal combustion engine provided with a supercharger. The vehicle control system further includes a supercharger controller that controls operation of the supercharger; and the supercharger controller controls the supercharger such that a supercharging pressure is lower when in the delivery state than when in the normal operation state.

According to this configuration, in the delivery state of the vehicle in which the motive power source is an internal combustion engine provided with a supercharger, the supercharger is controlled such that the supercharging pressure is lower than in the normal operation state, such that the rate of increase of the intake air pressure is lower than in the normal operation state when an acceleration operation is performed using the accelerator operation device. This thereby enables the rate of increase of drive torque to be suppressed, and enables the burden on the driver in the delivery state to be lessened.

In a sixth aspect of the disclosure, configuration may be made in which in the vehicle control system of the first aspect, the vehicle is a hybrid vehicle provided with an internal combustion engine and an electric motor as the motive power source. The vehicle control system further includes a charging unit that employs a generator driven by the engine to charge a battery for supplying electric power to the motor. The charging unit performs the charging such that a state of charge of the battery is maintained in a substantially fully charged state (of 95% or greater) when in the delivery state.

According to this configuration, in the delivery state, charging is performed such that the state of charge of the battery that supplies electric power to the electric motor is maintained in a substantially fully charged state. A situation in which the battery has insufficient charge immediately after being purchased by a user can accordingly be avoided.

In a seventh aspect of the disclosure, configuration may be made in which in the vehicle control system of the first aspect, the delivery state determination unit performs the determination by reading vehicle state information stored in a non-volatile memory. At the factory, information indicating that the vehicle is in the delivery state is written to the non-volatile memory as the vehicle state information, and at the sales location, the information indicating that the vehicle is in the delivery state is overwritten with information indicating that the vehicle is not in the delivery state. The vehicle state information can only be updated using a dedicated writing device.

According to this configuration, the information indicating that the vehicle is in the delivery state is written to the non-volatile memory as the vehicle state information at the factory. At the sales location, the information indicating that the vehicle is in the delivery state is overwritten with information indicating that the vehicle is not in the delivery state. The vehicle state information can only be updated using a dedicated writing device. This thereby enables the vehicle state information to be reliably prevented from being incorrectly overwritten with information indicating that the vehicle is not in the delivery state, for example by driver operation when in the delivery state.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a vehicle, comprising:
   an accelerator operation sensor that detects an accelerator operation amount indicating intent of a driver of a vehicle to accelerate; and
   an electronic control unit configured to:
      control drive torque in the vehicle driven by a motive power source;
      convert the accelerator operation amount detected by the accelerator operation sensor to a controlled accelerator operation amount; and
      determine a delivery state in which the vehicle is being delivered from a factory of manufacture to a sales location;
   the electronic control unit including a delivery conversion table applied in the delivery state, and employing the delivery state conversion table to execute the conversion when the vehicle has been determined to be in the delivery state;
   the delivery conversion table being set such that the drive torque is reduced in comparison to when a normal conversion table is applied in a normal operation state other than the delivery state; and
   the electronic control unit being configured to perform drive torque control to control the drive torque outputted by the vehicle to increase as the controlled accelerator operation amount increases.

2. The control system according to claim 1, wherein the delivery conversion table is set such that a ratio of an amount of change in the controlled accelerator operation amount with respect to an amount of change in the detected accelerator operation amount changes according to the detected accelerator operation amount, such that the ratio increases the greater the detected accelerator operation amount.

3. The control system according to claim 1, further comprising:
   a vehicle speed sensor that detects a vehicle speed of the vehicle, wherein the electronic control unit is configured to, based on a change in the vehicle speed, detect a hump arrival state, this being a state in which a front wheel of the vehicle has arrived at a hump, which is present on a surface of a road on which the vehicle is traveling and that causes an increase in vehicle travel load, the electronic control unit employs a specific conversion table to execute the conversion when the hump arrival state has been detected when in the delivery state, and the specific conversion table is set so as to increase the drive torque in comparison to that of the delivery conversion table.

4. The control system according to claim 1, wherein the electronic control unit is configured to perform learning in order to correct for either variation in a characteristic of a component configuring a vehicle drive system including the motive power source, or for variation in a control parameter resulting from assembly tolerance of the component, wherein the electronic control unit executes the learning when in the delivery state.

5. The control system according to claim 1, wherein:

the motive power source is an internal combustion engine provided with a supercharger;

the vehicle control system further comprises a supercharger controller that controls operation of the supercharger; and the supercharger controller controls the supercharger such that a supercharging pressure is lower when in the delivery state than when in the normal operation state.

6. The control system according to claim 1, wherein:

the vehicle is a hybrid vehicle provided with an internal combustion engine and an electric motor as the motive power source;

the vehicle control system further comprises a charging unit that employs a generator driven by the engine to charge a battery for supplying electric power to the motor; and the charging unit performs the charging such that a state of charge of the battery is maintained in a substantially fully charged state when in the delivery state.

7. The control system according to claim 1, wherein:

the electronic control unit is configured to perform the determination of the delivery state by reading vehicle state information stored in a non-volatile memory;

at the factory, information indicating that the vehicle is in the delivery state is written to the non-volatile memory as the vehicle state information, and at the sales location, the information indicating that the vehicle is in the delivery state is overwritten with information indicating that the vehicle is not in the delivery state; and the vehicle state information can only be updated using a dedicated writing device.

8. A control system for a vehicle, comprising:

an accelerator operation sensor to detect an amount of an accelerator operation operated by a driver in the vehicle; and circuitry configured to determine whether or not the vehicle is in a delivery state, calculate a first acceleration control amount as an acceleration control amount based on the amount of the acceleration operation according to a relationship between the amount of the acceleration operation and the first acceleration control amount when it is determined that the vehicle is not in the delivery state, calculate a second acceleration control amount as the acceleration control amount based on the amount of the acceleration operation according to a second relationship between the amount of the acceleration operation and the second acceleration control amount when it is determined that the vehicle is in the delivery state, the second acceleration control amount being smaller than the first acceleration control amount with respect to the amount of the acceleration operation, and control a drive torque outputted by the vehicle to increase as the acceleration control amount increases.

9. The control system according to claim 8, wherein in the second relationship, a ratio of an amount of change in the second acceleration control amount to an amount of change in the amount of the acceleration operation increases as the amount of the acceleration operation increases.

10. The control system according to claim 8, further comprising:

a vehicle speed sensor to detect a vehicle speed of the vehicle, wherein the circuitry is configured to detect, based on a change in the vehicle speed, a hump arrival state where a front wheel of the vehicle has arrived at a hump on a surface of a road on which the vehicle is traveling, and calculate a third acceleration control amount based on the amount of the acceleration operation according to a third relationship between the amount of the acceleration operation and the third acceleration control amount when the hump arrival state has been detected when the vehicle is in the delivery state, the third acceleration control amount being larger than the second acceleration control amount with respect to the amount of the acceleration operation.

11. The control system according to claim 8, wherein the circuitry is configured to control drive torque of a vehicle driven by a motive power source.

12. The control system according to claim 11, wherein the circuitry is configured to perform learning while the vehicle is in the delivery state, the learning being to correct for either variation in a characteristic of a component configuring a vehicle drive system including the motive power source, or for variation in a control parameter resulting from assembly tolerance of the component.

13. The control system according to claim 11, wherein the motive power source is an internal combustion engine including a supercharger, wherein the circuitry is further configured to control operation of the supercharger, and wherein the circuitry is configured to control the supercharger such that a supercharging pressure is lower when in the delivery state than when not in the delivery state.

14. The control system according to claim 11, wherein the vehicle is a hybrid vehicle including an internal combustion engine and an electric motor as the motive power source, wherein the vehicle control system further comprises a charger to charge a battery to supply electric power to the motor using a generator driven by the engine, and wherein the charger charges the battery such that a state of charge of the battery is maintained in a substantially fully charged state when the vehicle is in the delivery state.

15. The control apparatus according to claim 8, wherein the circuitry is configured to determine whether or not the vehicle is in the delivery state in which the vehicle is being delivered from a factory to a sales location.

16. The control system according to claim 15,
wherein the circuitry is configured to read vehicle state information stored in a non-volatile memory to determine whether or not the vehicle is in the delivery state,
wherein the vehicle state information indicating that the vehicle is in the delivery state is written to the non-volatile memory at the factory,
wherein the vehicle state information indicating that the vehicle is in the delivery state is overwritten with vehicle state information indicating that the vehicle is not in the delivery state at the sales location, and
wherein the vehicle state information is updatable only with a dedicated writing device.

17. A control method for a vehicle, comprising:
detecting an amount of an acceleration operation operated by a driver in a vehicle;
determining whether or not the vehicle is in a delivery state;
calculating a first acceleration control amount as an acceleration control amount based on the amount of the acceleration operation according to a relationship between the amount of acceleration operation and the first acceleration control amount when it is determined that the vehicle is not in the delivery state;
calculating a second acceleration control amount as an acceleration control amount based on the amount of the acceleration operation according to a second relationship between the amount of the acceleration operation and the second acceleration control amount when it is determined that the vehicle is in the delivery state, the second acceleration control amount being smaller than the first acceleration control amount with respect to the amount of the acceleration operation; and
controlling a drive torque outputted by the vehicle to increase the drive torque as the acceleration control amount increases.

* * * * *